United States Patent
Sloan et al.

(10) Patent No.: US 10,034,175 B2
(45) Date of Patent: Jul. 24, 2018

(54) INTERFERENCE COORDINATION PARTNERSHIP ESTABLISHMENT AND TERMINATION

(71) Applicant: NOKIA SOLUTIONS AND NETWORKS OY, Espoo (FI)

(72) Inventors: Charles Sloan, Lake in the Hills, IL (US); Mathias Pieroth, Gilching (DE); Ioannis Maniatis, Unterensingen (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 402 days.

(21) Appl. No.: 14/321,190

(22) Filed: Jul. 1, 2014

(65) Prior Publication Data

US 2016/0007206 A1    Jan. 7, 2016

(51) Int. Cl.
*H04W 4/00* (2018.01)
*H04W 16/10* (2009.01)
*H04W 88/08* (2009.01)

(52) U.S. Cl.
CPC ............ *H04W 16/10* (2013.01); *H04W 88/08* (2013.01)

(58) Field of Classification Search
CPC . H04W 72/0426; H04W 92/20; H04W 36/30; H04W 36/20; H04W 72/082; H04W 24/10; H04W 24/06; H04W 72/1289; H04W 24/02; H04L 43/50; H04L 1/1861; H04L 5/0032; H04L 27/2601; H04L 5/0053; H04B 15/00
See application file for complete search history.

(56) References Cited

U.S. PATENT DOCUMENTS

2013/0150044 A1*   6/2013   Zhang ............... H04W 52/0258
                                                          455/436

OTHER PUBLICATIONS

3GPP TS 36.423 (version 10.1.0 Release 10).*
3GPP TSG RAN WG3#69 (Oct. 11-15, 2010).*
LTE; Evolved Universal Terrestrial Radio Access (E-UTRA) an Evolved Universal Terrestrial Radion Access Network (E-UTRAN); Overall description; Stage 2, (3GPP TS 36.300 version 10.11.0 Release 10), ETSI, 650 Route des Lucioles, F-06921 Sophia Antipolis Cedex—France, Sep. 2013, 211 pages.

* cited by examiner

*Primary Examiner* — Yemane Mesfin
*Assistant Examiner* — Abdelillah Elmejjarmi
(74) *Attorney, Agent, or Firm* — Squire Patton Boggs (US) LLP

(57) ABSTRACT

Coordination of interference handling may be beneficial in a variety of communication systems. In particular, enhanced inter-cell interference coordination may benefit from proper configuration and setup, as well as termination, of partnerships amongst base stations. A method can include determining at a first base station of an interference coordination partnership pair a corresponding partner base station of the pair. The partner base station may not be configured regarding the partnership pair. The method can also include setting up the partnership pair with the partner base station.

34 Claims, 8 Drawing Sheets

INTERFERENCE COORDINATION PARTNERSHIP ESTABLISHMENT AND TERMINATION

BACKGROUND

Field

Coordination of interference handling may be beneficial in a variety of communication systems. In particular, enhanced inter-cell interference coordination may benefit from proper configuration and setup, as well as termination, of partnerships amongst base stations.

Description of the Related Art

In a conventional wireless communications network, base stations communicate with user equipment (UE) by radio frequency (RF). When the coverage area of two base stations overlap and when those base stations are using the same frequency then there is the potential for interference. The Third Generation Partnership Project (3GPP) has developed standards for enhanced inter-cell interference coordination (eICIC). To implement eICIC, a victim cell can send an X2AP: Load Information message to an aggressor cell with an Invoke Indication. The aggressor cell can then initiate resource status reporting with the victim cell such that the victim cell periodically sends X2AP: Resource Status Update messages to the aggressor cell. The aggressor cell can then minimize RF transmissions in subframes called Almost Blank Subframes (ABS). The aggressor cell can inform the victim cell which subframes are ABS using the X2AP: Load Information message.

The 3GPP standard indicates in 3GPP technical specification (TS) 36.300 (V10.11.0), section 16.1.5.2.2 "OAM may configure association between eNBs to use the time-domain inter-cell interference coordination." So if an association is configured on each eNB indicating eICIC partnership pairs then the following scenario can occur.

A micro eNB 1 cell 1 can be configured with the eNB ID and cell ID of its macro cell eICIC partner. The partner can be eNB 2 cell 1. The macro eNB 2 cell 1 can be configured with eICIC partner cells including eNB 1 cell 1.

The micro eNB can looks up in its database its partner eNB and cell. The micro eNB can send an X2AP: LOAD INFORMATION message to the macro eNB. This message can indicate the cell ID of the micro (Cell Information Item>>Cell ID IE). The message also contains the Invoke Indication IE set to ABS Information. The X2AP: LOAD INFORMATION message does not have an IE to indicate the macro partner cell.

Upon reception of the X2AP: LOAD INFORMATION message, the macro eNB 2 looks up in its database the pair of eICIC partner cells that includes eNB 1 cell 1 and determines that its own cell 1 is the eICIC partner of eNB1 cell 1.

At that point, eNB 2 can then send an X2AP: LOAD INFORMATION message to eNB 1 with the current ABS pattern for eNB 2 cell 1. Further, eNB 2 can initiate resource status reporting from its partner cell by sending an X2AP: RESOURCE STATUS REQUEST message to eNB 1 cell 1.

This scenario requires that eICIC partnership pairs are configured at both the macro and micro eNBs. This requires more effort than configuration on either the macro side only or the micro side only. It is also subject to errors if the eICIC partnership pairs are inconsistently configured.

There are other X2AP messages that have information elements (IEs) that identify both the cell ID of the cell sending the message and the cell ID of the cell receiving the message. The X2AP: MOBILITY CHANGE REQUEST is an example of such a message. However, there is conventionally no approach to utilizing such messages to overcome the limitations found in the above scenario.

SUMMARY

According to certain embodiments, a method can include determining at a base station of an interference coordination partnership pair a corresponding partner base station of the pair, wherein the partner base station is not configured regarding the partnership pair. The method can also include setting up the partnership pair with the partner base station.

In certain embodiments, a method can include receiving at candidate base station of an interference coordination partnership pair, a message regarding the partnership pair, wherein the candidate base station is not previously configured with an identity of an other base station of the pair. The method can also include determining the identity of the other base station of the pair based on the message. The method can further include setting up the partnership with the other base station.

A computer program product, according to certain embodiments, can encode instructions for performing a process. The process can include any of the preceding methods.

A non-transitory computer-readable medium, in certain embodiments, can encode instructions that, when executed in hardware, perform a process. The process can include any of the preceding methods.

According to certain embodiments, an apparatus can include at least one processor and at least one memory including computer program code. The at least one memory and the computer program code are configured to, with the at least one processor, cause the apparatus at least to determine at a base station of an interference coordination partnership pair a corresponding partner base station of the pair, wherein the partner base station is not configured regarding the partnership pair. The at least one memory and the computer program code are configured to, with the at least one processor, cause the apparatus at least to set up the partnership pair with the partner base station.

In certain embodiments, an apparatus includes at least one processor and at least one memory including computer program code. The at least one memory and the computer program code are configured to, with the at least one processor, cause the apparatus at least to receive at candidate base station of an interference coordination partnership pair, a message regarding the partnership pair, wherein the candidate base station is not previously configured with an identity of an other base station of the pair. The at least one memory and the computer program code are configured to, with the at least one processor, cause the apparatus at least to determine the identity of the other base station of the pair based on the message. The at least one memory and the computer program code are configured to, with the at least one processor, cause the apparatus at least to set up the partnership with the other base station.

An apparatus, according to certain embodiments, can include means for determining at a base station of an interference coordination partnership pair a corresponding partner base station of the pair, wherein the partner base station is not configured regarding the partnership pair. The apparatus can also include means for setting up the partnership pair with the partner base station.

An apparatus, in certain embodiments, can include means for receiving at candidate base station of an interference coordination partnership pair, a message regarding the partnership pair, wherein the candidate base station is not previously configured with an identity of an other base station of the pair. The apparatus can also include means for determining the identity of the other base station of the pair based on the message. The apparatus can further include means for setting up the partnership with the other base station.

BRIEF DESCRIPTION OF THE DRAWINGS

For proper understanding of the invention, reference should be made to the accompanying drawings, wherein.

DETAILED DESCRIPTION

Figure 1:
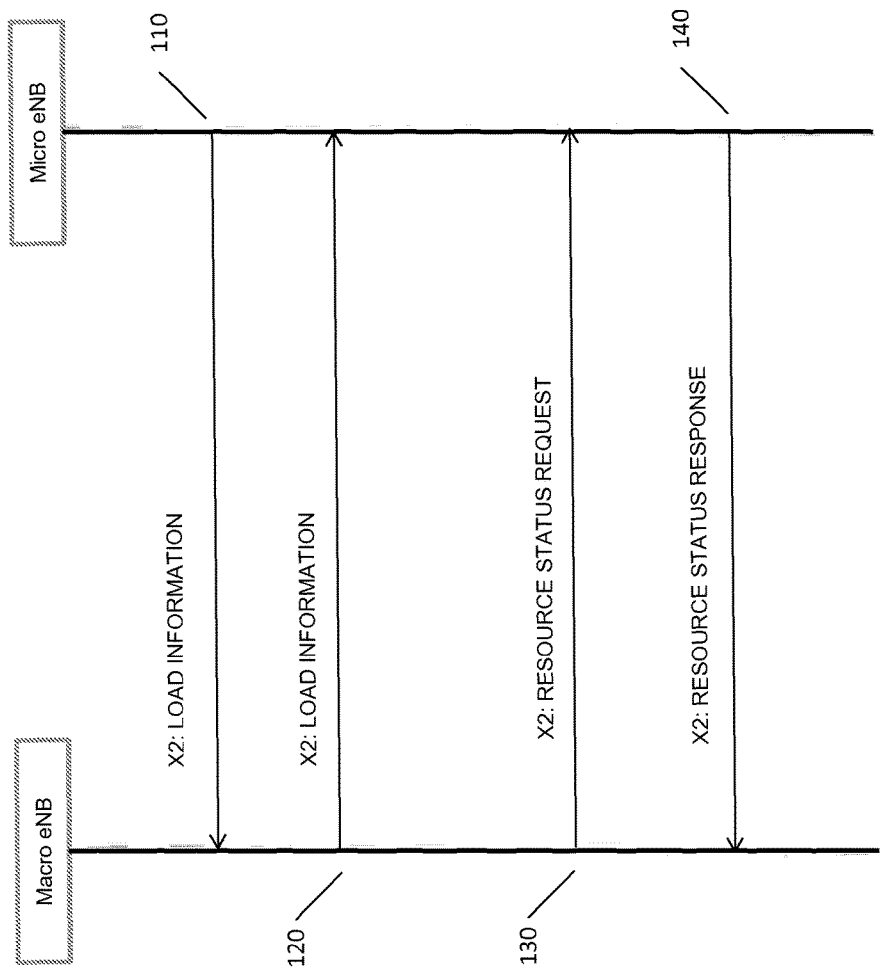
FIG. 1 illustrates partnership establishment according to solution 1 in certain embodiments.

Certain embodiments provide for at least three approaches or solutions for eCIC partnership establishment. Although the establishment described herein is described with reference to the example of eCIC, it should be understood that the partnership establishment may be broadly applied to other purposes and implementations.

Three numbered solutions are proposed below. Solution 1 may be applicable to devices such as long term evolution (LTE) evolved Node Bs (eNBs), both macro cell and small cell versions. Solutions 2 and 3 provide examples of alternative approaches, which may be applied to the same or other devices.

In solution 1 eICIC partnership can be configured on the micro cell. More particularly, in this solution, the eICIC partnership pair may be configured only on the micro eNB. In this example, the micro cell is an example of a victim cell. The victim cell may be a smell cell, such as a micro cell, pico cell, femto cell, or the like. Nevertheless, in certain cases a macro cell may be a victim.

The micro eNB can include the cell ID of its eICIC partner in a message used to set up the eICIC partnership. For example, a new IE could be added to the X2AP: LOAD INFORMATION message to indicate an eICIC Target Cell.

Alternatively, an existing IE can be reused in the design. The UL High Interference Information/Target Cell ID IE can be used to indicate the cell ID on the macro eNB that the micro cell requests to be the micro cell's eICIC partner. When the micro cell includes UL High Interference Information/Target Cell ID IE and the Invoke Indication IE set to ABS Information in the same X2AP: LOAD INFORMATION message, this transmitted information can signal to the macro eNB that the micro eNB wants an eICIC partnership between the Marco eNB cell identified by the UL High Interference Information/Target Cell ID IE and the micro eNB cell identified by the Cell Information Item>>Cell ID.

To permit such a message, or for other reasons, the micro eNB 1 cell 1 can be configured with the eNB ID and cell ID of its macro cell eICIC partner. The partner can, for example, be eNB 2 cell 1. By contrast, the macro eNB 2 cell 1 may not be configured with eICIC partner cells.

The micro eNB can look up in its database the micro eNB's partner eNB and cell. Then the micro eNB can send an X2AP: LOAD INFORMATION message to the macro eNB. This message can include the cell ID of the micro eICIC partner (Cell Information Item>>Cell ID IE). The message can also include the Invoke Indication IE set to ABS Information. The message can further include the UL High Interference Information/Target Cell ID IE, which can be used to indicate the cell ID on the macro eNB that micro cell requests to be the micro cell's eICIC partner.

Upon reception of the X2AP: LOAD INFORMATION message, the macro eNB 2 can determine that the macro eNB 2's own cell 1 is the eICIC partner of eNB1 cell 1 based on the UL High Interference Information/Target Cell ID IE received in the X2AP: LOAD INFORMATION message.

Upon such a determination, eNB 2 can send an X2AP: LOAD INFORMATION message to eNB 1 with the current ABS pattern for eNB 2 cell 1. Furthermore, eNB 2 can initiate resource status reporting from its partner cell by sending an X2AP: RESOURCE STATUS REQUEST message to eNB 1 cell 1.

The X2AP: LOAD INFORMATION message is a class 2 message, which means that conventionally there is no response. However, it may be useful for the micro eNB to know whether the partnership was accepted by the macro eNB. Therefore, in certain embodiments, the macro eNB can respond with an X2AP: LOAD INFORMATION message that contains the Invoke Indication IE set to ABS Information. A response without the Invoke Indication IE can indicate that the partnership is not accepted.

Certain implementations can also include a mechanism to terminate an eICIC partnership. The termination can be initiated by either the macro eNB or the micro eNB. The partnership termination can be indicated by sending an X2AP: LOAD INFORMATION message that does not contain the ABS Information IE or the Invoke Indication IE.

In certain embodiments, configuration of an eICIC partnership pair may only be required on the micro eNB. Moreover, the micro eNB may indicate to the macro eNB which macro cell the micro eNB requests as a partner. More specifically, the micro eNB can indicate to the macro eNB which macro cell the micro eNB requests as a partner by using the UL High Interference Information/Target Cell ID IE in the X2AP: LOAD INFORMATION message in combination with the presence of the Invoke Indication IE set to ABS Information.

Furthermore, in certain embodiments, confirmation or rejection of the partnership request may be provided by the macro eNB. Additionally, in certain embodiments the termination of the partnership can be either by the marco eNB or by the micro eNB. Other modifications are also possible.

According to solution 2, by contrast, the eICIC partnership can be configured on the macro cell. More specifically, the eICIC partnership pair can be configured only on the macro eNB. This solution can be similar to solution 1 except that the roles of eNB 1 cell 1 and eNB 2 cell 2 are reversed. Indeed, even the same mechanism to terminate the partnership as defined in solution 1 can be used for solution 2. However, in reversing the roles, the transmission of the ABS pattern can still sent from the macro to the pico. Thus, at least this aspect of certain embodiments may remain unchanged in solution 2 relative to solution 1.

According to solution 3 eICIC partnership can be configured on macro without a target cell ID. In this solution, the eICIC partnership pair may be configured only on the macro eNB.

In certain implementations, a micro eNB may have only one cell that uses the same frequency as its macro cell eICIC partner. In such a case, it may be possible to establish the partnership without the proprietary usage of UL High Interference Information/Target Cell ID IE to identify the cell on the partner cell on the micro eNB.

The micro eNB 1 cell 1 may not be configured with the eNB ID and cell ID of its macro cell eICIC partner. However, the macro eNB 2 cell 1 may be configured with eICIC partner cells including micro cell eNB 1 cell 1.

The macro eNB can look up in its database its partner eNB and cell. The macro eNB may have more than one eICIC partner cell, in which case the process can be repeated. Then, the macro eNB 2 can send an X2AP: LOAD INFORMATION message to the micro eNB 1. This message can include the cell ID of the macro eICIC partner (Cell Information Item>>Cell ID IE) and the Invoke Indication IE set to ABS Information. Optionally, the message can also include a current ABS pattern for eNB 2 cell 1.

Upon reception of the X2AP: LOAD INFORMATION message, the micro eNB 1 can determine that micro eNB 1's own cell 1 is the eICIC partner. It can determine this in, for example, the following way. If the micro eNB has only has 1 cell, then that cell must be the partner. If the micro eNB has more than one cell but only one of the micro eNB's cells has the same frequency as the macro cell that was identified in the X2AP: LOAD INFORMATION message, then the micro eNB can determine that the cell with the same frequency is the eICIC partner.

Having determined the partner, eNB 1 can optionally send an X2AP: LOAD INFORMATION message to eNB 2 to confirm the partnership establishment. Alternatively, eICIC partnership failure can also be indicated as noted below.

Upon confirmation of the partnership establishment, or without waiting for confirmation if confirmation is optional or unnecessary, eNB 2 can initiate resource status reporting from eNB 2's partner cell by sending an X2AP: RESOURCE STATUS REQUEST message to eNB 1 cell 1. The eNB 2 may also send an X2AP: LOAD INFORMATION message indicating the current ABS pattern for eNB 2 cell 1. If the ABS pattern was previously sent and has not changed, it may not be necessary to resend the ABS pattern.

When the eNB receives the X2AP: RESOURCE STATUS REQUEST message it can choose to fail the ABS Status reporting. This would indicate to the macro eNB that the eICIC partnership setup has failed. Furthermore, the same mechanism to terminate the partnership as defined in solution 1 can be used for solution 3.

Thus, in certain embodiments configuration of an eICIC partnership pair may only be required on the macro eNB. Furthermore, it is possible for the micro eNB to determine which of the micro eNB's cells is the eICIC partner for a given partnership request from a macro eNB without the macro eNB explicitly identifying a cell on the micro eNB.

Confirmation or rejection of the partnership request can be made by the micro eNB. Furthermore, as mentioned above termination of the partnership can be made by the macro eNB or micro eNB.

FIG. 1 illustrates partnership establishment according to solution 1 in certain embodiments. As shown in FIG. 1, at 110, the micro can initiate an eICIC partnership with one macro eNB cell based on the micro's configuration. Thus, the micro can send an X2 LOAD INFORMATION message to the macro. The message sent from the micro to the macro can include the UL High Interference Information→Target Cell ID to identify the partner macro cell and the Invocation Indication to indicate that an eICIC partnership is requested. At 120, the macro can confirm the partnership by responding with an X2 LOAD INFORMATION message. The message can include the UL High Interference Information→Target Cell ID to identify the partner micro cell. The message can also include the ABS Information IE and the Invoke Indication. The presence of the Target Cell ID and the Invoke Indication can confirm that the macro eNB accepts the partnership.

At 130, the macro can initiate an X2 Resource Status procedure by sending a resource status request. In the request, Report Characteristics IE can correspond to Composite Available Capacity and ABS Status Periodic. Then, at 140, the micro can indicate success by sending a resource status response.

Figure 2:
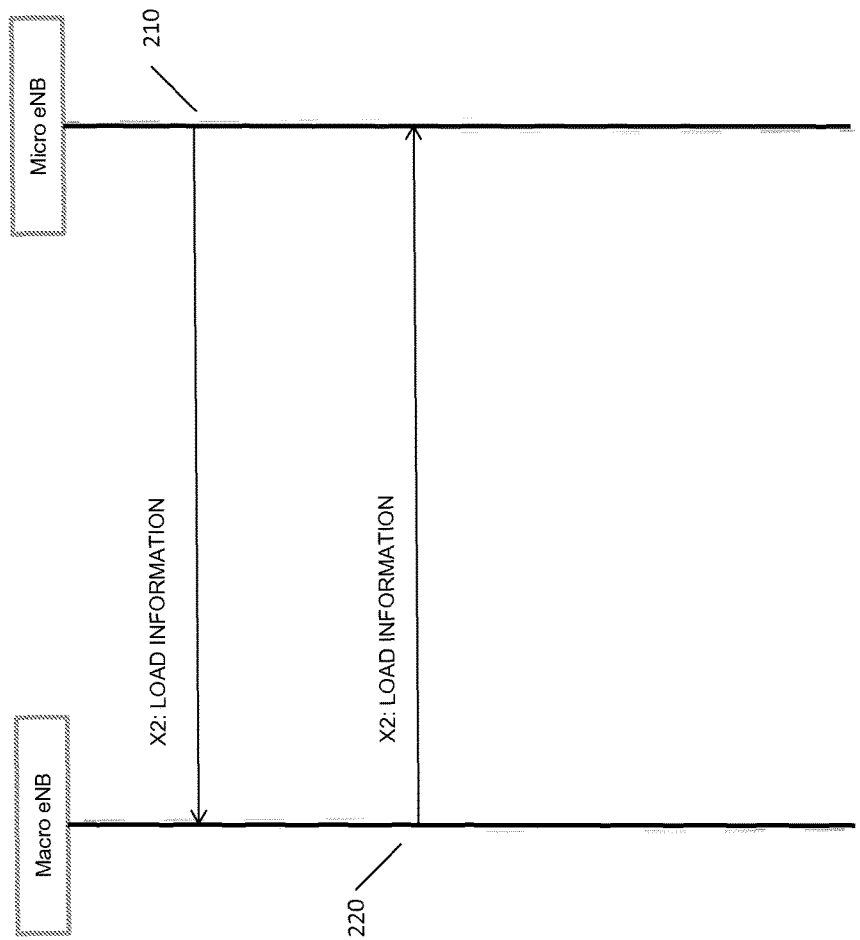
FIG. 2 illustrates partnership initiation failure according to solution 1 in certain embodiments.

FIG. 2 illustrates partnership initiation failure according to solution 1 in certain embodiments. As shown in FIG. 2, at 210, the micro can send an X2 LOAD INFORMATION message to the macro. The message can include the UL High Interference Information→Target Cell ID to identify the partner macro cell and the Invoke Indication to indicate that an eICIC partnership is requested. However, at 220, the macro eNB may not accept the eICIC partnership request. Thus, the macro may reject the partnership by responding with an X2 LOAD INFORMATION message. The macro eNB can indicate rejection of the eICIC partnership request by not including the Invoke Indication. If the macro does not respond at all within a timeout period, the micro can assume that the partnership is not set up.

There can be various implementations. For example, in one implementation ABS Information or Target Cell ID are not included. In another implementation these IEs are included with ABS Information set to "ABS Inactive."

Figure 3:
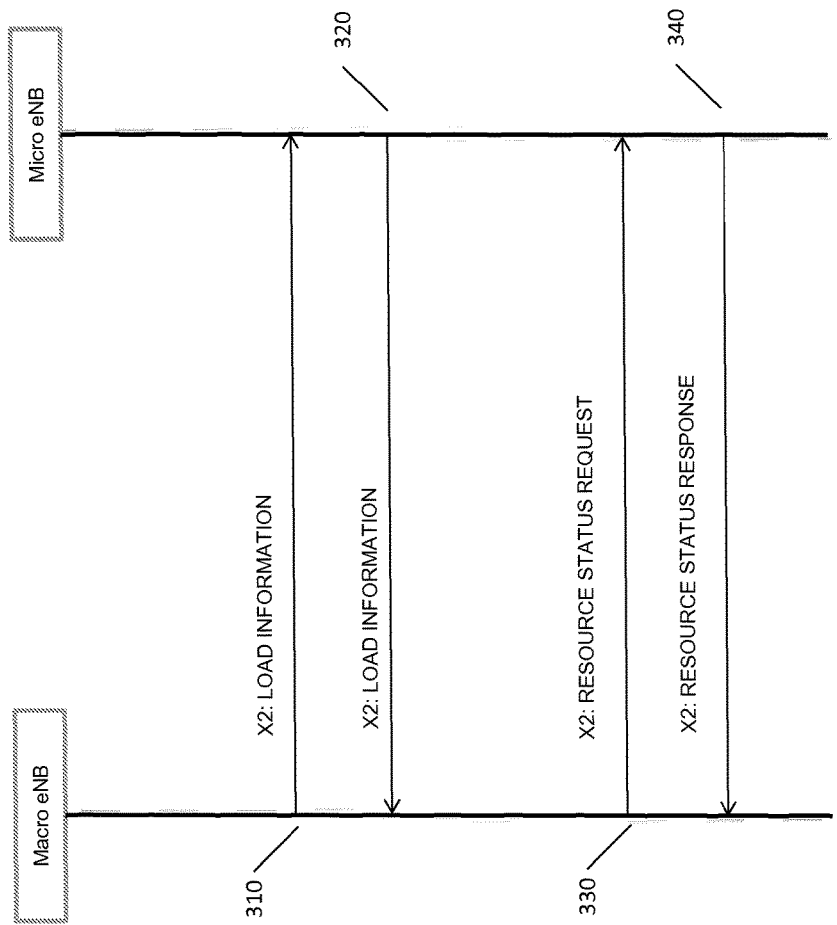
FIG. 3 illustrates partnership termination, macro initiated, according to solution 1 in certain embodiments.

FIG. 3 illustrates partnership termination, macro initiated, according to solution 1 in certain embodiments. As shown in FIG. 3, at 310 the macro can decide to terminate the eICIC relationship. This may be because the feature is disabled on macro or the macro cell is out of service, for example. The macro can indicate termination of the eICIC relationship by sending X2AP: LOAD INFORMATION message without ABS Information or Invoke Indication. The Target Cell ID can be included.

At 320, the micro can acknowledge eICIC partnership release. In the acknowledgement Target Cell ID may be included, while Invoke Indication may be omitted.

At 330, the macro can stop Resource Status reporting. The macro can send an X2AP: RESOURCE STATUS REQUEST with Registration Request=Stop. Then, at 340, the micro can provide a resource status response indicate success.

Figure 4:
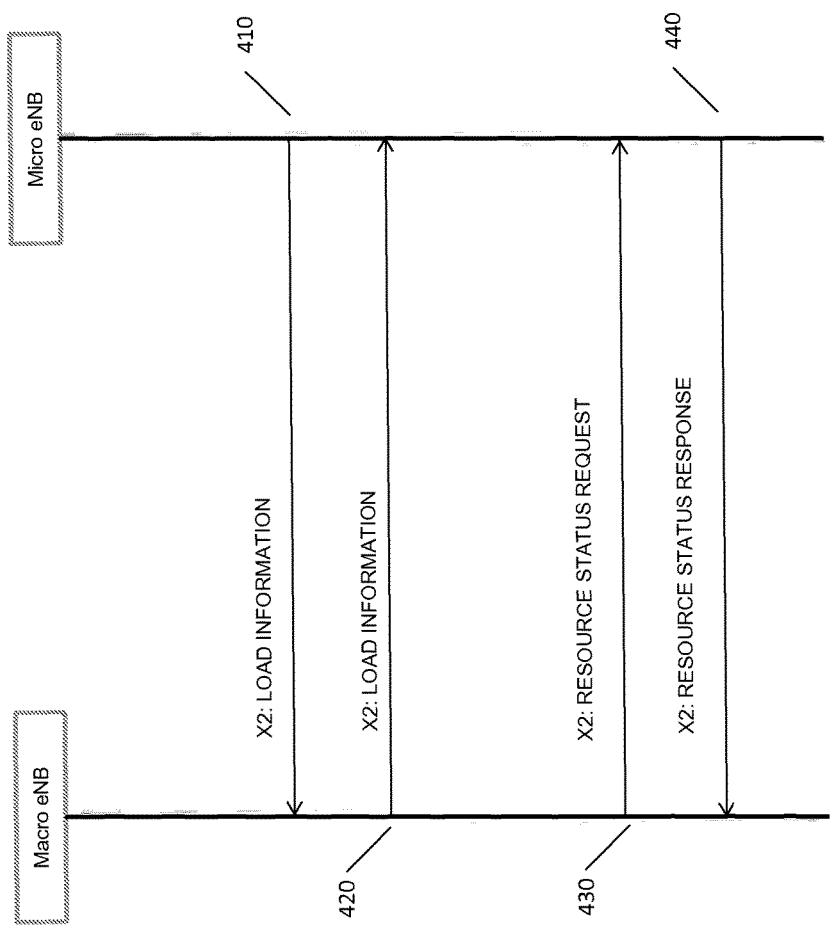
FIG. 4 illustrates partnership termination, micro initiated, according to solution 1 in certain embodiments.

FIG. 4 illustrates partnership termination, micro initiated, according to solution 1 in certain embodiments. As shown in FIG. 4, at 410 the micro can decide to terminate the eICIC relationship. This may be because the feature is disabled on micro or the micro cell is out of service, for example. The micro can indicate termination of the eICIC relationship by sending X2AP: LOAD INFORMATION message without ABS Information or Invoke Indication. The Target Cell ID can be included.

At 420, the macro can acknowledge eICIC partnership release. In the acknowledgement Target Cell ID may be included, while Invoke Indication may be omitted.

At 430, the macro can stop Resource Status reporting. The macro can send a resource status request with Registration Request=Stop. Then, at 440, the micro can provide a resource status response indicate success.

Figure 5:
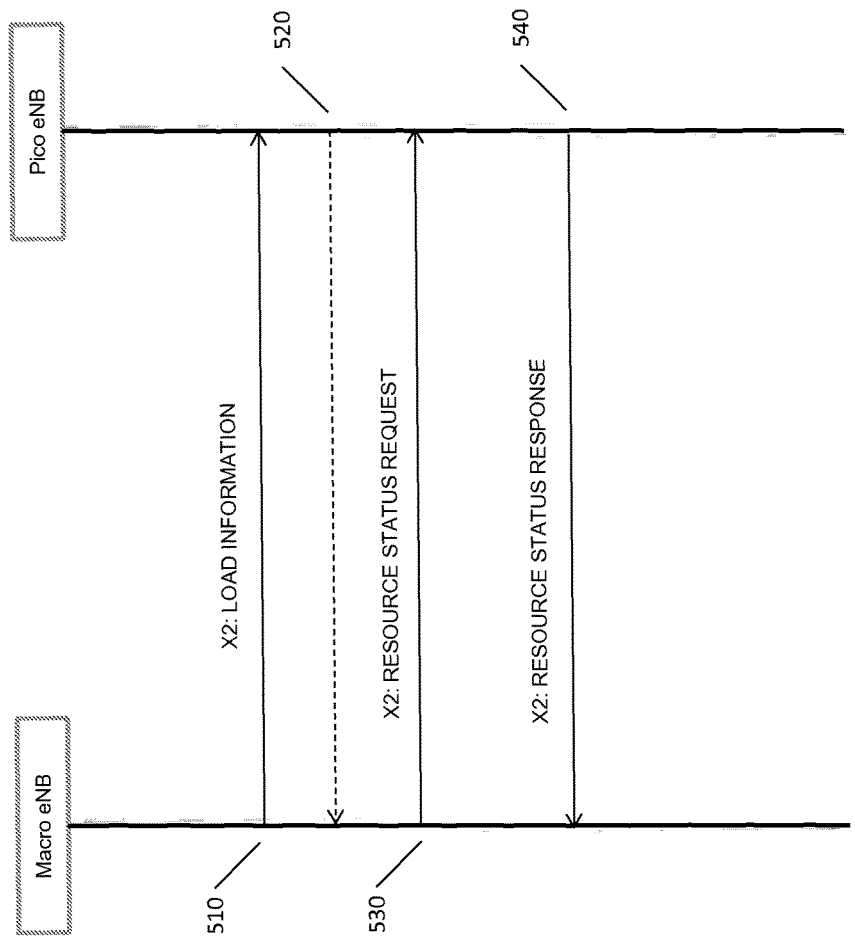
FIG. 5 illustrates partnership establishment according to solution 3 in certain embodiments.

FIG. 5 illustrates partnership establishment according to solution 3 in certain embodiments. As shown in FIG. 5, the macro can initiate an eICIC partnership with each pico partner based on the macro's configuration. At 510, therefore, the macro can initiate the partnership by sending an X2 LOAD INFORMATION message with the current ABS pattern. The macro eNB can include the ECGI of the macro cell that is initiating the partnership. Optionally, at 520, the pico can confirm that the pico eNB accepts the partnership request.

Then, at 540, the macro can initiate the X2 Resource Status procedure by sending a resource status request. In the request the Report Characteristics IE can indicate Composite Available Capacity and ABS Status Periodic.

At 550, the pico can use a resource status response to indicate success if both CAC and ABS Status reporting are successfully established. Pico can reject partnership by failing the ABS Status reporting. If there is currently Resource Status reporting for MLB only for the pico cell, such reporting can be stopped after establishing the new resource status reporting.

Figure 6:
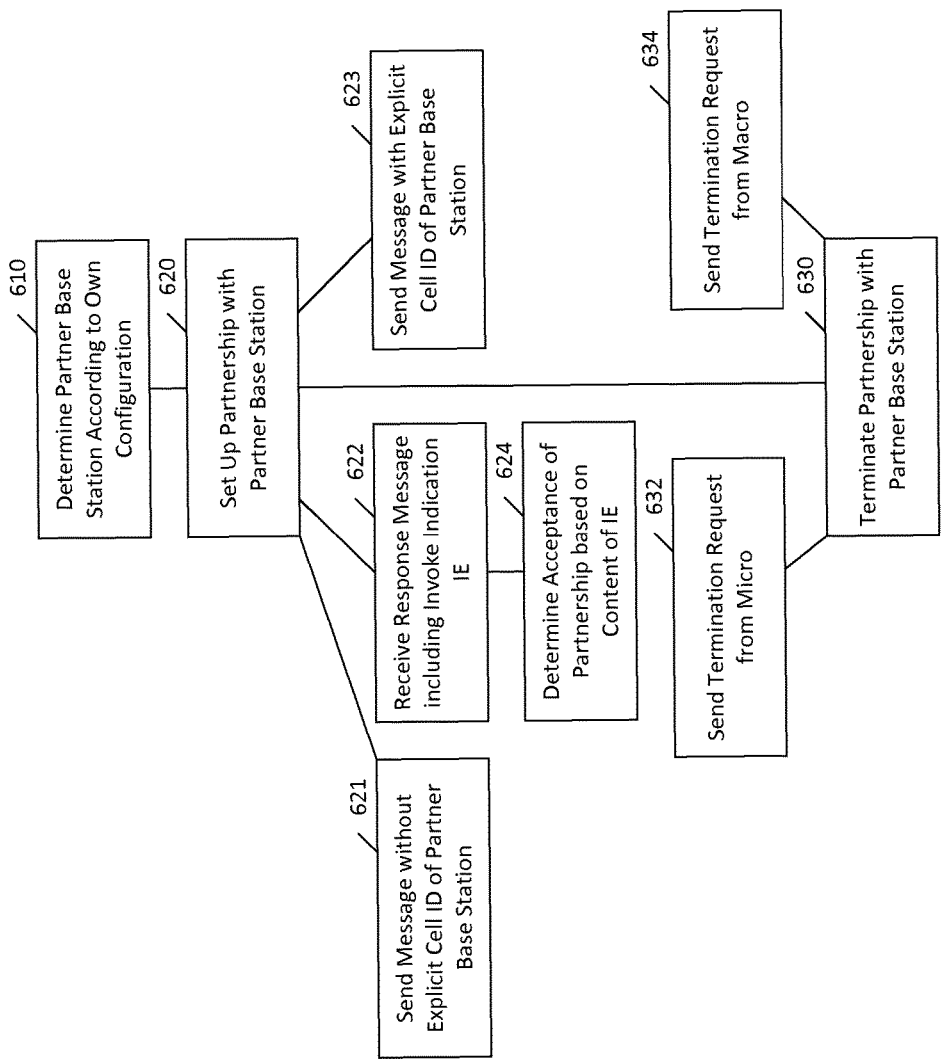
FIG. 6 illustrates a method according to certain embodiments.

FIG. 6 illustrates a method according to certain embodiments. The method of FIG. 6 may be performed by a base station, such as one of the macro, micro, or pico base stations shown in FIGS. 1-5. As shown in FIG. 6, a method can include, at 610, determining at a base station of an interference coordination partnership pair a corresponding partner base station of the pair. The partner base station may not be configured regarding the partnership pair. The interference coordination partnership pair can be an enhanced inter-cell interference coordination partnership pair.

The base station here can refer to any access point, LTE eNB, gateway, or the like radio access technology. Other devices having similar functionality, such as relay nodes, may be included as well. In certain embodiments, the base station is a micro eNB and the partner base station is a macro eNB, or vice versa. Other examples are also possible.

The method can also include, at 620, setting up the partnership pair with the partner base station. The term "partner base station" here does not imply that the partnership has already been completed, but merely that the base station has been identified by the base station's configuration as the appropriate target for such partnership.

The base station can be a micro evolved Node B and the partner base station can be a macro evolved Node B, or the base station can be the macro evolved Node B and the partner base station can be the micro evolved Node B. Thus, as mentioned above with reference to solutions 1 and 2, many of the roles of the base stations can be reversed.

The setting up can also include, at 622, receiving a response message including an invoke indication information element and, at 624, determining whether the response message indicates that the partnership has been accepted based on the content or presence of the invoke indication information element. For example, the very fact that the message includes the invoke indication information element can indicate that the partnership has been accepted, or particular content in the information element may provide such indication.

The setting up can also include, at 621, sending a message, wherein the message does not explicitly indicate the cell identification of the cell of the partner base station. Alternatively, the setting up can include, at 623, the base station sending a message including a cell identification of the partner base station. The cell identification can be included in a new information element in an X2AP load information message. Alternatively, the setting up can involve the base station including UL High Interference Information/Target Cell ID IE and the Invoke Indication IE set to ABS information in a single X2AP: LOAD INFORMATION message.

The method can also include, at 630, terminating the partnership in connection with the partnership termination message. The partnership termination message can be sent by a micro at 632 or by a macro at 634.

More particularly, the termination can include the requesting base station indicating the termination request by sending an X2AP: LOAD INFORMATION message including a special purpose information element to indicate a partnership termination request. The base station receiving the termination request may optionally confirm that it accepts the termination request by sending an X2AP: LOAD INFORMATION message including a special purpose information element. This may be the same special purpose element used to request the termination. These messages can also include the special purpose information element used for cell identification, discussed above.

Alternatively, the termination can include the requesting base station indicating the termination request by sending an X2AP: LOAD INFORMATION message including the UL High Interference Information/Target Cell ID IE, not including the Invoke Indication IE and not including the ABS Information IE. The absence of the Invoke Indication IE and not including the ABS Information IE can indicate that partnership termination is being requested. The base station receiving the termination request may optionally confirm that the base station accepts the termination request by sending an X2AP: LOAD INFORMATION message including the UL High Interference Information/Target Cell ID IE, not including the Invoke Indication IE and not including the ABS Information IE.

Figure 7:
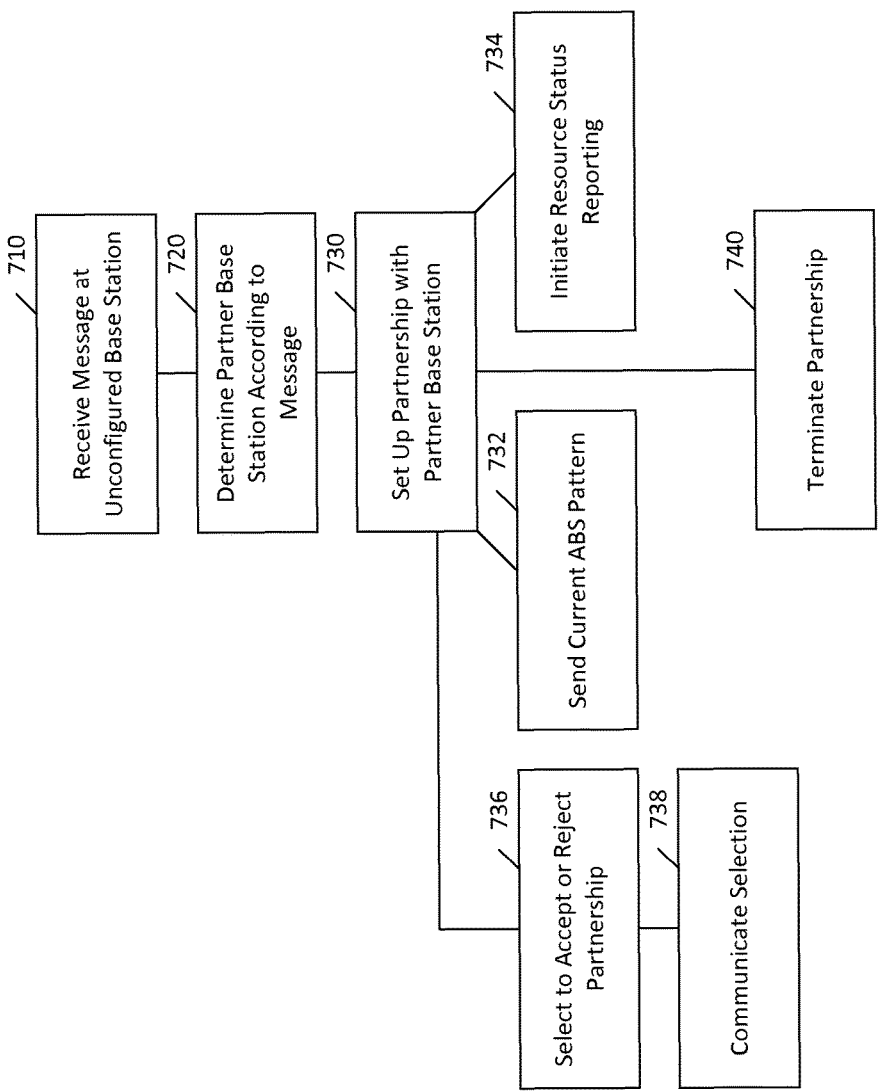
FIG. 7 illustrates another method according to certain embodiments.

FIG. 7 illustrates another method according to certain embodiments. The method of FIG. 6 may be performed by a base station, such as one of the macro, micro, or pico base stations shown in FIGS. 1-5. A pair of devices can operate the methods of FIG. 6 and FIG. 7 together with one another, or a single device can be configured to perform both methods.

As shown in FIG. 7, a method can include, at 710, receiving at a candidate base station of an interference coordination partnership pair, a message regarding the partnership pair, wherein the candidate base station is not previously configured with an identity of the other base station of the pair. Optionally, the message may not explicitly identify the cell identification of the other base station.

The method can also include, at 720, determining the identity of the other base station of the pair based on the message. The method can further include, at 730, setting up the partnership with the other base station.

The setting up can include, at 732, sending a current almost blank subframe pattern for the candidate base station to the other base station. The setting up can also include, at 734, initiating resource status reporting from or to the other base station.

The method can also include, at 736, selecting one of accepting the partnership or rejecting the partnership. The method can further include, at 738, communicating the acceptance or rejection to the other base station.

The method can additionally include, at 740, terminating the partnership either by the candidate base station or in response to the other base station.

Figure 8:
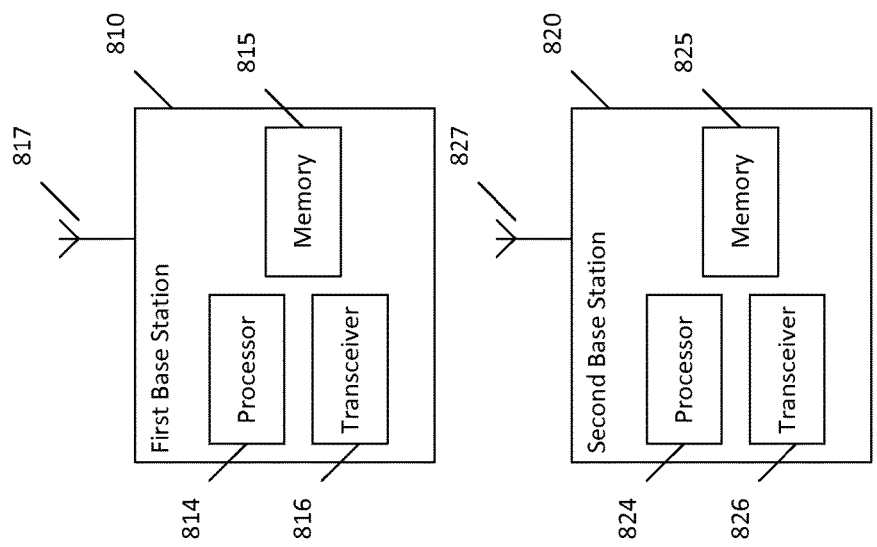
FIG. 8 illustrates a system according to certain embodiments.

FIG. 8 illustrates a system according to certain embodiments of the invention. It should be understood that each block of the flowchart of FIG. 9 and any combination thereof may be implemented by various means or their combinations, such as hardware, software, firmware, one or more processors and/or circuitry. In one embodiment, a system may include several devices, such as, for example, first base station 810 and second base station 820. The system may include more than one second base station 820 and more than one first base station 810, although only one of each is shown for the purposes of illustration. A base station can be an access point, an eNode B (eNB), or any of the other network elements discussed herein. For example, first base station 810 can be a macro eNB and second base station 820 can be a micro eNB, or vice versa. The first base station 810 can correspond to the base station described in reference to FIG. 6 and the second base station 820 can correspond to the partner base station in FIG. 6. Likewise the second base station 820 can correspond to the candidate base station of FIG. 7 and the first base station 810 can correspond to the other base station of FIG. 7.

As shown in FIG. 8, each of these devices may include at least one processor or control unit or module, respectively indicated as 814 and 824. At least one memory may be provided in each device, and indicated as 815 and 825, respectively. The memory may include computer program instructions or computer code contained therein. One or more transceiver 816 and 826 may be provided, and each device may also include an antenna, respectively illustrated as 817 and 827. Although only one antenna each is shown, many antennas and multiple antenna elements may be provided to each of the devices. Other configurations of these devices, for example, may be provided. For example, first base station 810 and second base station 820 may be additionally configured for wired communication, in addition to wireless communication, and in such a case antennas 817 and 827 may illustrate any form of communication hardware, without being limited to merely an antenna. Likewise, first base station 810 and second base station 820 may be additionally configured for wired communication, and in such cases antenna 817 may illustrate any form of wired communication hardware, such as a network interface card.

Transceivers 816 and 826 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is as software that can run on a server.

In an exemplary embodiment, an apparatus, such as a base station, may include means for carrying out embodiments described above in relation to FIGS. 6 and 7 or any of the other figures.

Processors 814 and 824 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (e.g., procedures, functions, and so on). Memories 815 and 825 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as first base station 810 and/or second base station 820, to perform any of the processes described above (see, for example, FIGS. 1 through 7). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 8 illustrates a system including a first base station 810 and a second base station 820, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Various implementations of the above can be made. For example, in certain embodiments the micro cell can have the ability to indicate to the macro eNB, which cell on the macro eNB the micro eNB wants for an eICIC partner. This may be useful if only micro eNBs have the eICIC partnership configuration. Such an approach may also have the benefit or advantage of reducing inconsistent configuration errors in which the partnerships are configured differently on the macro and the micro.

Various embodiments may have further or alternative benefits or advantages. For example, the design to confirm the partnership setup may cause the micro cell to know whether it should retry the partnership setup at a later time. Such a confirmation may also be useful from an operations and maintenance perspective.

Likewise, an explicit partnership termination can cause the micro cell to know whether it should retry the partnership setup at a later time. Furthermore, such explicit partnership termination can permit either partner to initiate termination of the partnership for reasons such as the operator turning off the feature.

In this document, the term "micro" is used as an example and can be interpreted to mean "micro," "pico," "femto," "small," or the like. Similarly, as noted above, the term "micro cell" can provide an example of a victim cell. Thus, the above principles and techniques can be applied to victim cells of a variety of kinds, including macro cells, if desired.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary

3GPP Third Generation Partnership Project
ABS Almost Blank Subframe
eICIC Enhanced Inter-Cell Interference Coordination
eNB Enhanced Node B
OAM Operation, Administration and Maintenance
RF Radio Frequency
UE User Equipment
X2AP X2 Application Protocol

We claim:

1. A method, comprising:
   determining at a base station of an interference coordination partnership pair a corresponding partner base station of the pair, wherein the partner base station is unaware of the partnership pair; and
   setting up the partnership pair with the partner base station.

2. The method of claim 1, wherein the base station comprises a micro evolved Node B and the partner base station comprises a macro evolved Node B, or the base station comprises the macro evolved Node B and the partner base station comprises the micro evolved Node B.

3. The method of claim 1, wherein the setting up additionally comprises:
   receiving a response message including an invoke indication information element; and
   determining whether the response message indicates that the partnership has been accepted based on the content or presence of the invoke indication information element.

4. The method of claim 1, wherein the setting up comprises sending a message, wherein the message does not explicitly indicate the cell identification of the cell of the partner base station.

5. The method of claim 1, wherein the interference coordination partnership pair operates as an enhanced inter-cell interference coordination (eICIC) partnership pair.

6. The method of claim 1, wherein the setting up comprises the first base station sending a message including a cell identification of the partner base station.

7. The method of claim 6, wherein the cell identification is included in an information element in an X2AP load information message.

8. The method of claim 6, wherein the setting up comprises the first base station including UL High Interference Information, Target Cell ID IE and the Invoke Indication IE set to ABS information in a single X2AP: LOAD INFORMATION message.

9. The method of claim 1, further comprising:
   sending or receiving a partnership termination message; and
   terminating the partnership in connection with the partnership termination message.

10. The method of claim 9, wherein the termination comprises the requesting base station indicating the termination request by sending an X2AP: LOAD INFORMATION message including an information element to indicate a partnership termination request.

11. The method of claim 9, wherein the termination comprises the requesting base station indicating the termination request by sending an X2AP: LOAD INFORMATION message including the UL High Interference Information, Target Cell ID IE, not including the Invoke Indication IE and not including the ABS Information IE.

12. A method, comprising:
    receiving at candidate base station of an interference coordination partnership pair, a message regarding the partnership pair, wherein the candidate base station was unaware of an identity of another base station of the pair prior to receiving the message;
    determining the identity of the other base station of the pair based on the message; and
    setting up the partnership with the other base station.

13. The method of claim 12, wherein the setting up includes sending a current almost blank subframe (ABS) pattern for the candidate base station to the other base station.

14. The method of claim 12, wherein the setting up comprises initiating resource status reporting from the other base station or initiating resource status reporting to the other base station.

15. The method of claim 12, wherein the message does not explicitly identify the cell identification of the other base station.

16. The method of claim 12, wherein the setting up comprises:
    selecting one of accepting the partnership or rejecting the partnership; and
    communicating the acceptance or rejection to the other base station.

17. The method of claim 12, further comprising:
    terminating the partnership either by the candidate base station or in response to the other base station.

18. An apparatus, comprising:
    at least one processor; and
    at least one memory including computer program code,
    wherein the at least one memory and the computer program code are configured to, with the at least one processor, cause the apparatus at least to
    determine at a base station of an interference coordination partnership pair a corresponding partner base station of the pair, wherein the partner base station is unaware of the partnership pair; and
    set up the partnership pair with the partner base station.

19. The apparatus of claim 18, wherein the base station comprises a micro evolved Node B and the partner base station comprises a macro evolved Node B, or the base station comprises the macro evolved Node B and the partner base station comprises the micro evolved Node B.

20. The apparatus of claim 18, wherein the at least one memory and the computer program code are configured to, with the at least one processor, cause the apparatus at least to, when setting up the partnership pair:

receive a response message including an invoke indication information element; and determine whether the response message indicates that the partnership has been accepted based on the content or presence of the invoke indication information element.

21. The apparatus of claim 18, wherein the at least one memory and the computer program code are configured to, with the at least one processor, cause the apparatus at least to, when setting up the partnership pair, send a message, wherein the message does not explicitly indicate the cell identification of the cell of the partner base station.

22. The apparatus of claim 18, wherein the interference coordination partnership pair is configured to operate as an enhanced inter-cell interference coordination (eICIC) partnership pair.

23. The apparatus of claim 18, wherein the setting up comprises the first base station sending a message including a cell identification of the partner base station.

24. The apparatus of claim 23, wherein the cell identification is included in an information element in an X2AP load information message.

25. The apparatus of claim 23, wherein the at least one memory and the computer program code are configured to, with the at least one processor, cause the apparatus at least to set up the partnership pair by the first base station including UL High Interference Information, Target Cell ID IE and the Invoke Indication IE set to ABS information in a single X2AP: LOAD INFORMATION message.

26. The apparatus of claim 18, wherein the at least one memory and the computer program code are configured to, with the at least one processor, cause the apparatus at least to:

send or receive a partnership termination message; and terminate the partnership in connection with the partnership termination message.

27. The apparatus of claim 26, wherein the termination comprises the requesting base station indicating the termination request by sending an X2AP: LOAD INFORMATION message including an information element to indicate a partnership termination request.

28. The apparatus of claim 26, wherein the termination comprises the requesting base station indicating the termination request by sending an X2AP: LOAD INFORMATION message including the UL High Interference Information, Target Cell ID IE, not including the Invoke Indication IE and not including the ABS Information IE.

29. An apparatus, comprising:

at least one processor; and at least one memory including computer program code, wherein the at least one memory and the computer program code are configured to, with the at least one processor, cause the apparatus at least to receive at candidate base station of an interference coordination partnership pair, a message regarding the partnership pair, wherein the candidate base station was unaware of an identity of another base station of the pair prior to receiving the message;

determine the identity of the other base station of the pair based on the message; and set up the partnership with the other base station.

30. The apparatus of claim 29, wherein the at least one memory and the computer program code are configured to, with the at least one processor, cause the apparatus at least to set up the partnership by sending a current almost blank subframe (ABS) pattern for the candidate base station to the other base station.

31. The apparatus of claim 29, wherein the at least one memory and the computer program code are configured to, with the at least one processor, cause the apparatus at least to set up the partnership by initiating resource status reporting from the other base station or initiating resource status reporting to the other base station.

32. The apparatus of claim 29, wherein the message does not explicitly identify the cell identification of the other base station.

33. The apparatus of claim 29, wherein the at least one memory and the computer program code are configured to, with the at least one processor, cause the apparatus at least to set up the partnership by selecting one of accepting the partnership or rejecting the partnership; and communicating the acceptance or rejection to the other base station.

34. The apparatus of claim 29, wherein the at least one memory and the computer program code are configured to, with the at least one processor, cause the apparatus at least to terminate the partnership either by the candidate base station or in response to the other base station.

* * * * *